Jan. 25, 1966           K. C. ALLISON           3,230,793

INDEXING MECHANISM

Filed May 10, 1962                            4 Sheets-Sheet 1

INVENTOR
KENNETH C. ALLISON
BY *Jennings B. Thompson*
ATTORNEY

Jan. 25, 1966 K. C. ALLISON 3,230,793
INDEXING MECHANISM
Filed May 10, 1962 4 Sheets-Sheet 3

INVENTOR
KENNETH C. ALLISON
BY Jennings B. Thompson
ATTORNEY

Jan. 25, 1966    K. C. ALLISON    3,230,793
INDEXING MECHANISM

Filed May 10, 1962    4 Sheets-Sheet 4

INVENTOR
KENNETH C. ALLISON
BY
ATTORNEY

United States Patent Office 3,230,793
Patented Jan. 25, 1966

3,230,793
INDEXING MECHANISM
Kenneth C. Allison, Crystal Lake, Ill., assignor to CTS Corporation, Elkhart, Ind., a corporation of Indiana
Filed May 10, 1962, Ser. No. 193,823
18 Claims. (Cl. 74—527)

This invention relates to indexing mechanisms generally, and in particular to indexing mechanisms used with rotary electric switches.

The indexing mechanism of this invention operates in the same way as most prior art indexing mechanisms in that it has detents which are resiliently forced against a circular row of protrusions in an indexing plate. The detents fit into the valleys between the protrusions and move from valley to valley only when considerable torque is exerted on the shaft. The valleys are located to correspond with desired switch positions.

All previous indexing mechanisms of this type had one feature in common—the reaction to the spring force exerted on the detents was resisted by the shaft. That is, previously the indexing mechanism was made up of the index plate which provided the protrusions and resulting valleys and which was usually attached to the switch stators, one or more detents which engaged the protrusions, the spring plate which biased the detents toward the protrusions, the shaft to which the spring plate was attached, and a mounting bushing. The shaft was equipped with a groove which received a C-washer which in turn engaged the end of the mounting bushing. The groove on the shaft was located in such a way that the spring plate would have to be compressed before the C-washer could be installed in the groove. This placed a sufficient amount of strain in the spring plate to hold the detents against the index plate with the proper force.

This arrangement of parts has two major disadvantages. First, it is extremely difficult to mass produce indexing mechanisms of this type and maintain an equal amount of compression in the spring plates. Second, the torque required to rotate the shaft from position to position will decrease rapidly as this type unit is used.

The first problem results from the arrangement of parts. The amount of compression placed in the spring plate is determined by two dimensions: the distance from where the spring plate is staked on the shaft to the groove and the distance from the indexing plate to the end of the mounting bushing. Both of these dimensions are subject to machining and assembling tolerances which are inherent in mass produced parts, and which can cause large variations in the torque required to operate the indexing mechanism by causing variations in the amount of compression placed in the spring plate.

The second problem results from the large amount of wear which takes place between the C-washer and the end of the mounting bushing as the shaft is rotated. Life tests of this type indexing mechanism illustrate graphically that their torque requirements decline rapidly with use. This rapid wear results from the small amount of surface area in contact between the C-washer and the end of the mounting bushing. With only a small surface area to resist the spring force, a high unit pressure is created between the two members. This high unit pressure causes the mating surfaces of the two members to erode rapidly as the shaft is rotated.

It is a principal object of this invention to provide an indexing mechanism in which the force exerted by the resilient means is not transferred to the shaft. It is an additional object of this invention to provide an indexing mechanism which will require substantially the same operating torque throughout its useful life. It is a further object of this invention to provide an indexing mechanism with increased stability and improved indexing action.

It is an additional important object of this invention to provide a large area to resist the force exerted by the spring plate so that the compression initially placed in the plate will not be reduced by excessive wear between the moving and stationary members.

It is a further object and important feature of this invention to provide a back-up surface to engage the spring plate adjacent to the stop carried by the plate to prevent the stop from stressing the plate beyond its elastic limit.

It is also an object of this invention to provide an indexing mechanism which is so arranged and constructed that one detent controls the positioning of the mechanism at all times even though a plurality is used.

The invention comprises a shaft, a spring plate, an indexing plate, detent means, and a front plate parallel to and spaced from the indexing plate. These parts are arranged so that the spring plate is compressed between the front plate and the detent means, which in turn engages the indexing plate. The shaft serves to maintain the proper alignment between the parts and to rotate the spring plate and detent means relative to the protrusions on the indexing plate. A wide flat surface is provided on the front plate to act as a thrust bearing for the spring plate with a low unit bearing pressure to reduce the rate of wear of the spring plate and prolong the life of the unit.

The invention will now be describd in detail making reference to the attached drawings in which.

Figure 1:
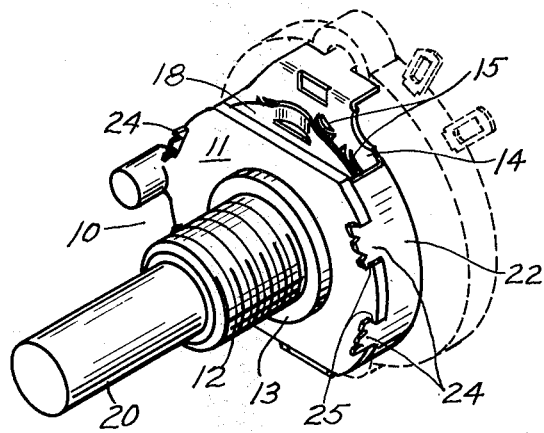
FIGURE 1 is an isometric view of an indxing mechanism constructed in accordance with the invention, in which the detents are integrally connected to the spring plate.
Figure 2:
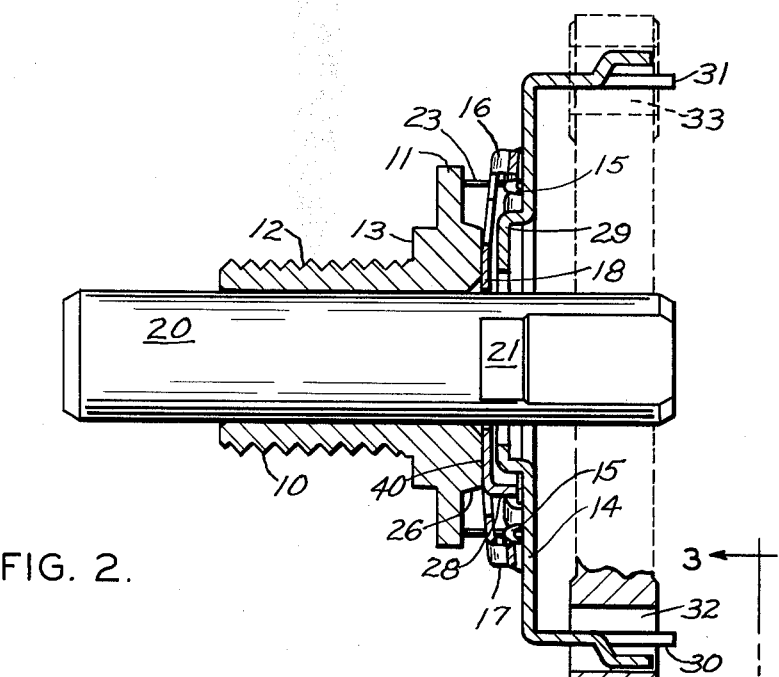
FIGURE 2 is a vertical cross-sectional view illustrating the relationship of the parts of the indexing mechanism of FIGURE 1 in the assembled condition.
Figure 3:
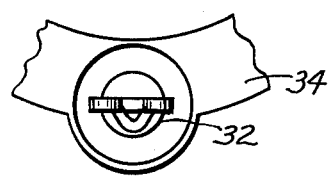
FIGURE 3 is a rear fragmentary view of the end of the arm attached to the indexing plate and which is used to assemble the switch wafers to the indexing mechanism.
Figure 4:
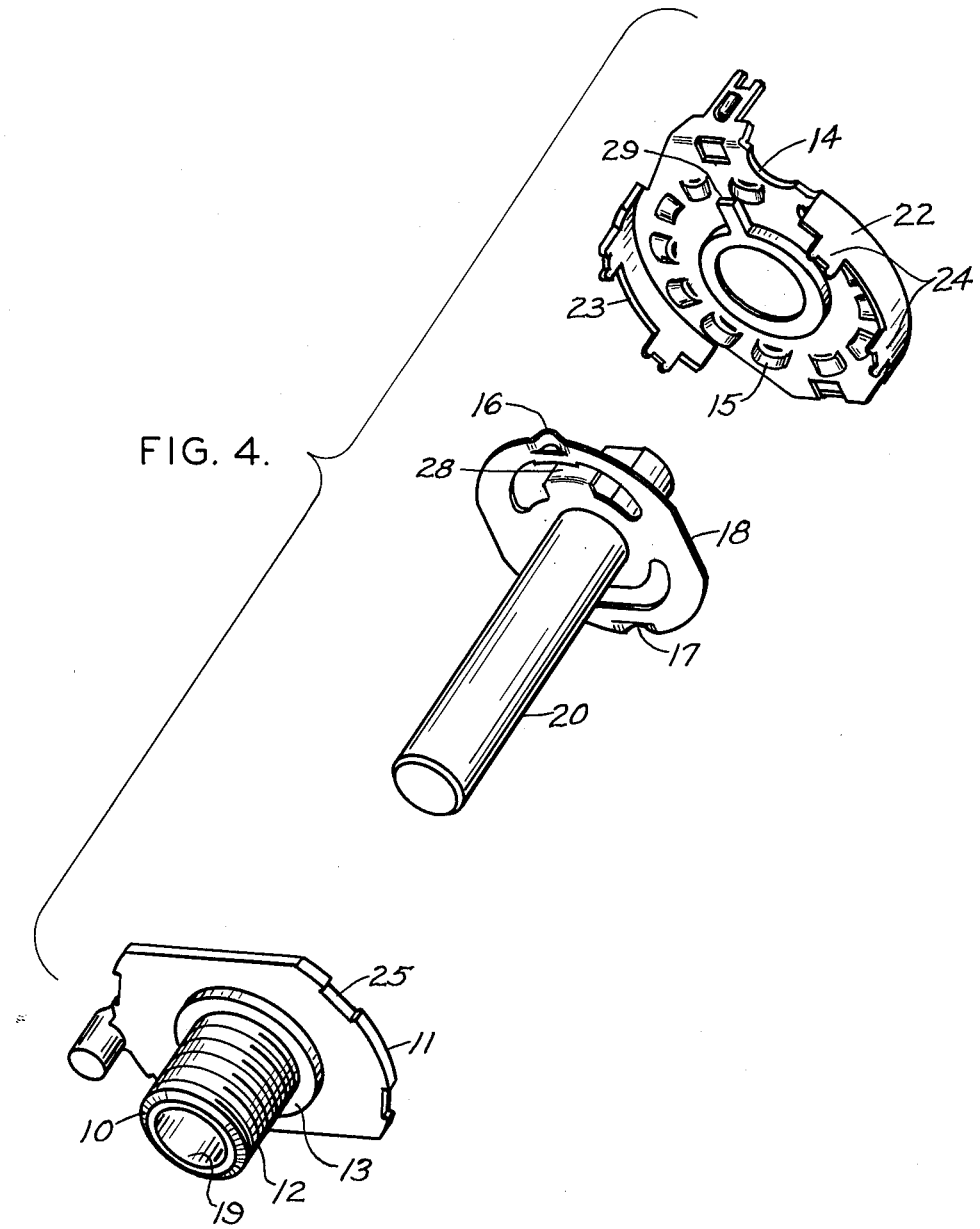
FIGURE 4 is an exploded isometric view of the various parts of the indexing mechanism of FIGURE 1.

The indexing mechanism illustrated in FIGURES 1–4 will be described first. It is made up of four major parts; the front plate 11, the index plate 14, the spring plate 18 and the shaft 20.

As illustrated in the drawings, the front plate 11 is an integral part of the mounting bushing 10. The mounting bushing has a threaded portion 12, which is used to mount the indexing mechanism to the panel, and a bore 19 in which the shaft 20 is journalled. It also has the shoulder 13 which is used to space the front plate 11 from the panel in which the switch is mounted. On the opposite side of the front plate from the shoulder 13 is a similar shoulder 26 which serves as the thrust bearing for the spring plate 18. These elements are shown integrally connected together, however, this would not necessarily need be the case as the threaded portion 12 could be attached to the front plate 11 by other means as also could the shoulders 13 and 26.

The index plate 14 is a diamond shaped flat piece of metal formed with a circular row of protrusions 15 which are identically shaped and equally spaced along a circular path around the center of the plate. These protrusions combine to provide valleys between them to receive the detents 16 and 17 carried by the spring plate 18. Integrally attached to the periphery of the index plate and extending outwardly perpendicular thereto are the flanges 22 and 23 which engage the plate 11 when the device is assembled to space the indexing plate from the front plate a predetermined distance. To assemble these two members, lugs 24 are formed integrally with the flanges 22 and 23 and arranged to protrude through slots 25 formed in the edge of the plate 11. The lugs 24 are then staked as shown in FIGURE 1 to complete the assembly of the unit.

The distance the index plate and the front plate 11 are spaced apart is less than the amount of curvature initially placed in the spring plate 18 so that when the unit is assembled and the spring plate 18 is placed between the index plate 14 and the front plate 11, it will be flattened between the two plates. This flattening action causes the inherent resiliency of the spring plate 18 to force the detents 16 and 17 against the index plate 14 with a predetermined amount of force. The distance between the plates and the amount of curvature in the spring plate determine the amount the spring plate will be stressed when assembled and also determine the amount of force exerted by the spring plate against the detents. With only two dimensions controlling the spring force rather than the conventional four, the compression placed in the spring plate can be much more accurately controlled.

The detents 16 and 17 will, of course, hunt the position with regard to the protrusions 15 which will tend to relieve the stress in the spring plate 18. Therefore, they will locate themselves in the valleys between the protrusions. To change their position it is necessary to apply torque to the shaft 20 to force the detents 16 and 17 to move up and over the adjacent protrusions 15 and into the next valley. One of the detents, i.e., detent 16, is formed larger than the other detent to allow for manufacturing errors. By making the detent 16 larger to fill the valley between the protrusions and the detent 17 smaller, a slight misalignment of parts can occur without interfering with the operation of the detents.

To transmit the torque necessary to rotate the spring plate, the shaft 20 is provided with mill flats 21 which engage a flat sided hole formed in the center of the spring plate. The shaft, of course, extends on past the index plate a sufficient distance to engage the rotary wafer switch which is attached to the indexing mechanism so that as the shaft is rotated it will also rotate the movable contact of the switch.

When the spring plate 18 is assembled on the shaft 20 it is usually staked so that the spring plate will prevent axial movement of the shaft after the unit is assembled. This is not necessary since the shaft could be held against axial movement in other ways, however, it is usually convenient to do it in this manner. In this assembly, the shaft is relieved of every function except that of transmitting torque to the spring plate and locating the spring plate with regard to the rest of the indexing mechanism.

The shoulder 26 which is located on the opposite side of the plate 11 from the shoulder 13 provides a broad surface area 40 to resist the spring force exerted by the spring plate 18. By providing this large area, which is in effect a thrust bearing, the unit force between the spring plate and this area 40 is held to a minimum. This greatly reduces the rate of wear of the two members, thus prolonging the life of the unit and ensuring that the force exerted by the spring plate on the detents 16 and 17 does not diminish greatly throughout the life of the unit.

The spring plate also carries a stop 28 which engages the protrusion 29 formed in the index plate and stops the rotation of the shaft in either direction. In the type of indexing mechanism previously used where the spring plate was attached to the shaft and was not supported in any other manner, if the operator continued to apply torque to the shaft after the stop 28 engaged the protrusion 29, the spring plate would begin to twist due to the couple existing between the protrusion and the spring plate. If sufficient torque was applied, the yield strength of the spring plate could be easily exceeded and permanent deformation would take place. This occurred quite frequently in the previous indexing mechanisms. In the construction illustrated, however, this type of damage to the spring plate is obviated. The area 40 of the shoulder 26 is broad enough to back up the spring plate and to support the area immediately adjacent the stop 28 in such a manner that the only way the spring plate can be damaged is for sufficient force to be exerted on the shaft to shear the stop 28 from the plate. In other words, it eliminates the possibility of the twisting action which previously could take place.

The shoulder 26 serves yet another purpose. For stability purposes, it is advantageous to have the detents located as far from the shaft as possible. It is also desirable to keep the space occupied by the indexing mechanism to a minimum. Both of these desirable features are accomplished if the spring plate is flattened when installed to the point where the detent carrying edges will move about the same distance on each side of a vertical plane passing through the flat center portion when the detent moves from one valley to another. This means that the spring plate must be spaced from the front plate a sufficient distance to allow this movement. This is accomplished by the shoulder 26.

To facilitate the assembly of the switch wafer units to the indexing mechanism, the index plate is equipped with the arms 30 and 31 integrally attached thereto. These arms are arranged to snugly fit the holes 32 and 33 provided in the stator 34 of the wafer switches. As illustrated only one switch section is shown assembled on the unit, however, by simply forming the arms 30 and 31 sufficiently long any number of rotary wafer switches can be attached to the indexing mechanism. After the switches are assembled on the arms, they are staked as shown in the drawings to rigidly attach the switch units to the indexing mechanism.

In FIGURES 5, 6, 7, and 8 an alternate embodiment of the indexing mechanism is illustrated. The general arrangement of the parts remains the same, the difference being that the spring plate 18 of the embodiment described above which carried the detents 16 and 17 as integral parts thereof is replaced with a more complicated and more rigidly constructed detent mechanism. Such an indexing mechanism has no advantages in particular over the type described above, however, it has certain features which are desirable but which also increase the cost of the mechanism. Therefore the two could be described as being the cheaply constructed low cost model versus the more expensive quality version of the same mechanism.

The mechanism is similar except that the detents are removed from the spring plate and replaced with the drive arm 50 which is equipped with openings 51 and 52 to receive balls 53 and 54 which in turn extend through the openings and engage the protrusions on the indexing plate in the same manner as the detents 16 and 17 did in the embodiment described above. Holding these balls in engagement with the protrusions is the spring plate 55 which is held in position by the drive arm 50 and the front plate 11'. The force exerted on the front plate 11' by the spring plate 55 is transmitted from the front plate 11' to the indexing plate through the flanges 22' and 23' in the same manner as was done in the other embodiment. In other words, the spring force is contained between the front plate 11' and the indexing plate 14' so that no axial force is transmitted to the shaft 20'.

The drive arm 50 is equipped with a flat sided opening which engages the milled flats 21' on the shaft so that the drive arm will rotate with the shaft. As the drive arm rotates, the balls 53 and 54 roll up and over each of the protrusions in the same manner as the detents 16 and 17. Since the balls are free to rotate within the openings 51 and 52, the friction between the detents and the indexing plate is greatly reduced resulting in a smoother operating mechanism. Here again provision is made for manufacturing errors by making the opening 52 larger than opening 51. This allows the ball 54 to adjust to slight misalignments between it and the protrusions.

Another feature of this version of the indexing mechanism is the fact that the spring force exerted on the balls can be changed without affecting the strength of the stop. In other words in this embodiment the spring serves no other purpose than to urge the balls into engagement with the protrusions whereas in the embodiment described above the spring plate not only carried the detents and provided the spring force but it also provided the stop for limiting the rotation of the indexing mechanism. In this latter embodiment the stop 60 is a part of the drive arm 50 making it possible for the spring plate to be changed from a thinner to a thicker one or vice versa without being concerned with the effect this might have on the strength of the stop member.

Figure 5:
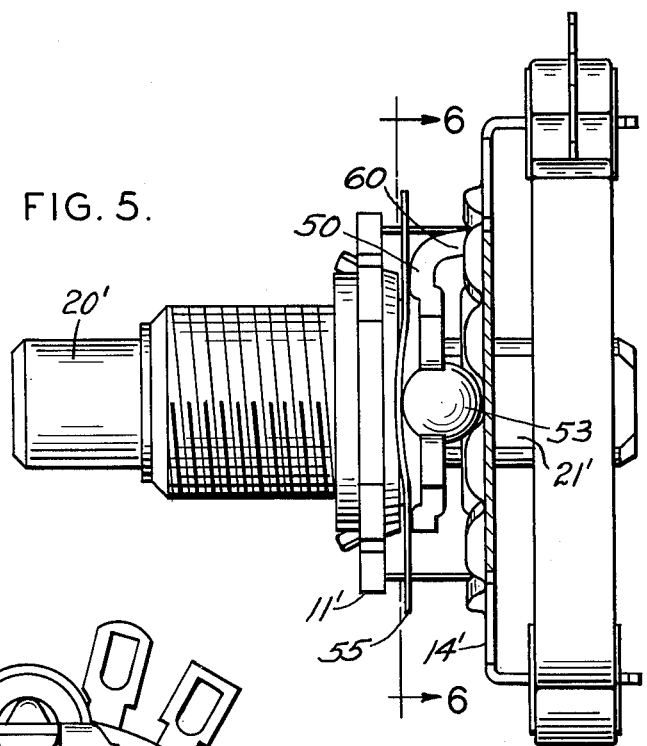
FIGURE 5 is a side view of another embodiment of an indexing mechanism constructed in accordance with this invention with portions removed in which the detents are two spherically shaped balls.
Figure 6:
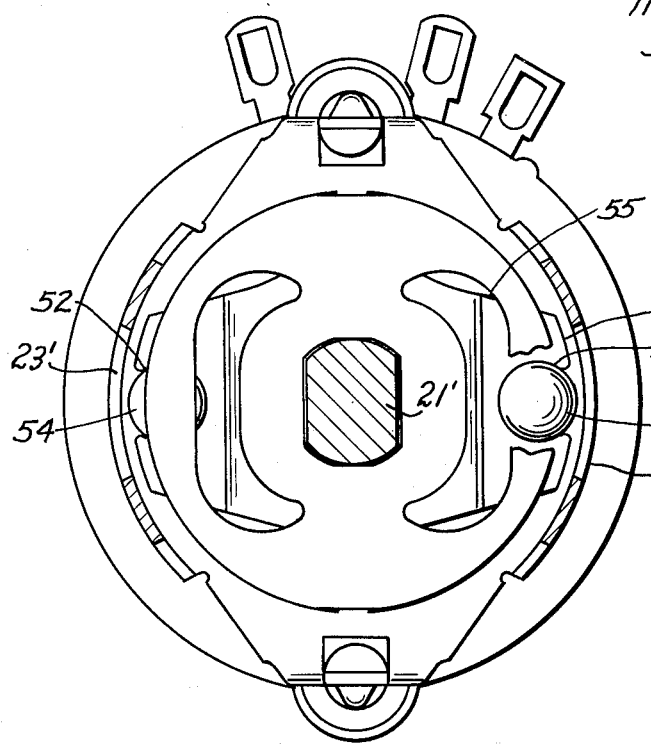
FIGURE 6 is a sectional view taken along line 6—6 of FIGURE 5, assuming that FIGURE 5 shows the complete structure.
Figure 7:
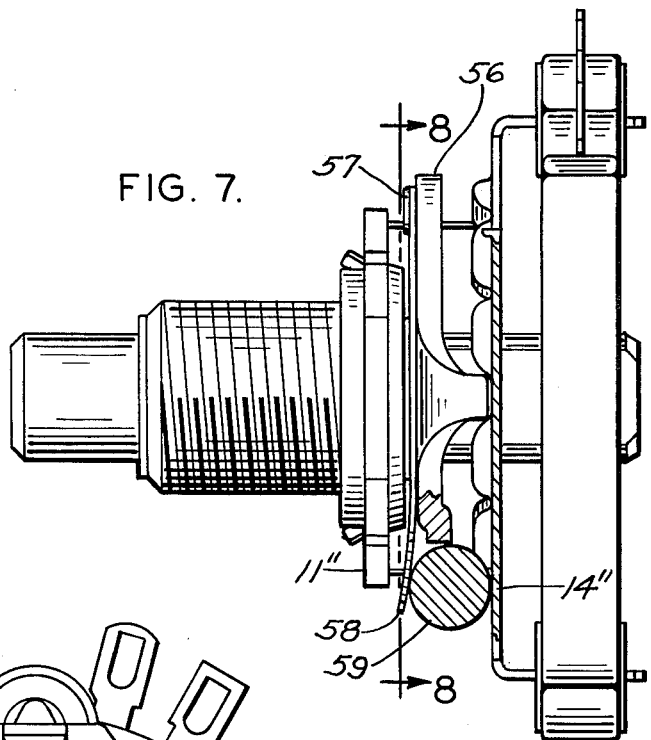
FIGURE 7 is a side view of still another embodiment of an indexing mechanism with portions removed.
Figure 8:
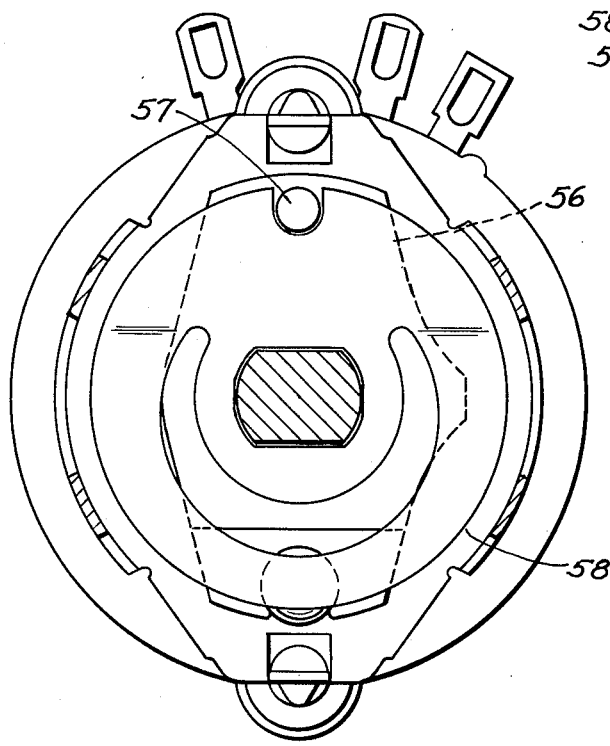
FIGURE 8 is a sectional view taken along line 8—8 of FIGURE 7, assuming that FIGURE 7 shows the complete structure.

FIGURES 7 and 8 show a one ball detent indexing mechanism as compared with the two ball detent indexing mechanism illustrated in FIGURES 5 and 6. The only difference between the two mechanisms is that in place of the opening for the one ball, a boss 57 is provided on the drive arm 56 to engage the spring plate 58 and make sure that it rotates along with the drive arm when the shaft is rotated. This type is used where a good smooth detent action is required and only a small amount of torque is available.

While there has been illustrated and described what is at present considered to be a preferred embodiment of the present invention, and additional modifications thereof, it will be appreciated that numerous changes and modifications are likely to occur to those skilled in the art, and it is intended in the appended claims to cover all those changes and modifications which fall within the true spirit and scope of the present invention.

The invention claimed is:

1. An indexing mechanism for an electric switch, comprising, in combination,
   a stationary first plate and a second plate;
   spacing means for fixedly mounting the first plate in spaced parallel relationship to the second plate;
   a single rotatable shaft extending through both of the plates for operating the switch;
   a plurality of spaced protrusions on the second plate equidistant from the longitudinal axis of the shaft;
   detent means disposed between the plates and arranged to be rotated by the shaft; and
   spring means abutting against the first plate and biasing the detent means into engagement with the protrusions.

2. An indexing mechanism for an electric switch comprising, in combination,
   a stationary first plate having a plurality of protrusions formed therein;
   a second plate fixedly attached to and spaced from the first plate;
   resilient means flattened between the first and second plates;
   a detent means carried by the resilient means and engageable with the protrusions formed on the first plate; and
   a shaft arranged to rotate the resilient means.

3. The indexing mechanism of claim 2 wherein the detent means comprises a pair of detent members and one of the detent members is larger than the other of the detent members.

4. The indexing mechanism of claim 2 in which the resilient means comprises an initially curved spring plate of resilient material.

5. The indexing mechanism of claim 4 in which the detent means comprises a pair of detents formed diametrically opposite each other on the periphery of the spring plate.

6. The indexing mechanism of claim 4 further characterized by the fact that the second plate is equipped with a projecting area of reduced diameter to provide a thrust bearing for the spring plate and to space the spring plate from the second plate.

7. The indexing mechanism of claim 6 in which the spring plate is equipped with stop means adjacent the area of reduced diameter.

8. An indexing mechanism for an electric switch comprising:
   a stationary first plate and a second plate arranged in spaced parallel relationship, the plates being fixedly secured to each other;
   a preformed arcuate spring plate flattened between the plates and biased against the second plate;
   a single shaft extending perpendicularly through the plates and arranged to rotate the spring plate;
   a plurality of protrusions formed in the second plate, the protrusions being equally spaced from the shaft along a circular path; and
   a detent carried by the spring plate and engageable with the protrusions on the second plate.

9. An indexing mechanism for an electric switch comprising:
   a stationary first plate and a second plate;
   spacing means for fixedly mounting the first plate in spaced parallel relationship to the second plate;
   a shaft rotatably mounted in the first plate and extending through the second plate, the shaft having a noncircular portion located between the plates;
   a spring plate of resilient material flattened between the first and second plates and equipped with a noncircular opening to engage the noncircular portion of the shaft so that the spring plate will rotate with the shaft;
   a plurality of spaced protrusions on the second plate equidistant from the axis of the shaft and protruding toward the spring plate;
   and a detent on the spring plate arranged ot engage the protrusions on the second plate.

10. The indexing mechanism of claim 9 in which the first plate is equipped with a shoulder extending toward the second plate to provide a bearing surface for the spring plate and to space the spring plate from the first plate.

11. The indexing mechanism of claim 10 in which stop means is provided on the spring plate and is arranged to be supported by the shoulder on the first plate.

12. The indexing mechanism of claim 10 in which the spring plate is equipped with two detents located diametrically on the periphery of the plate.

13. The indexing mechanism of claim 12 in which the second plate is equipped with diametrically opposite parallel arms extending perpendicularly therefrom and arranged to support the switch concentric with the axis of the shaft.

14. An indexing mechanism for an electric switch comprising:
   a stationary first plate and a second plate in spaced parallel relationship, the first plate having a plurality of protrusions and being fixedly secured to the second plate;
   a rotatable shaft extending through at least one of the plates; and
   indexing means between the plates constrained to rotate with the shaft, the indexing means comprising a drive arm having an aperture, a ball in the aperture and engageable with the protrusions, and resilient means between the drive arm and the second plate biasing the ball into engagement with the protrusions.

15. An indexing mechanism for an electric switch comprising:
   a stationary first plate and a second plate in spaced parallel relationship, the plates being fixedly secured to each other;
   a plurality of protrusions on the first plate, said protrusions being spaced along a circular path;
   a rotatable shaft extending perpendicularly through the second plate and along the central axis of the circular path along which the protrusions are located;
   detent means carried by the shaft comprising a drive arm constrained to rotate with the shaft and disposed between the first plate and the second plate;
   apertures in the drive arm radially spaced from the shaft the same distance as the protrusions;
   spherical members located in the apertures in engagement with the protrusions; and
   resilient means between the drive arm and the second plate biasing the spherical members toward the first plate.

16. The indexing mechanism of claim 15 in which one aperture is smaller than the other of the apertures so that there is substantially less clearance between the one aperture and the spherical member located in the one aperture than between the other of the apertures and the spherical member located in the other of the apertures.

17. The indexing mechanism of claim 15 wherein the difference between the diameter of one of the spherical members and the size of the aperture associated therewith is less than the difference between the diameter of the other of the spherical members and the size of the aperture associated with the other of the spherical members.

18. In an indexing mechanism, the combination of a stationary first plate having a plurality of spaced protrusions disposed in a circular pattern along the periphery of the plate, a second plate fixedly secured to the stationary first plate, a single shaft supported only for rotation by the plates, a detent disposed between a pair of adjacent protrusions and constrained to rotate with the shaft, and a resilient means flattened between the first plate and the second plate biasing the detent against the first plate, the force exerted by the resilient means being against the first and second plates and not transferred to the shaft whereby solely upon rotating the shaft the detent rides the spaced protrusions and provides a detent action.

References Cited by the Examiner

UNITED STATES PATENTS

| | | | |
|---|---|---|---|
| 2,130,219 | 9/1938 | Allison | 74—527 |
| 2,292,717 | 8/1942 | Rubenstein | 74—527 X |
| 2,505,548 | 4/1950 | Hutt | 74—527 X |
| 2,531,246 | 11/1950 | Batcheller | 74—527 |
| 2,770,982 | 11/1956 | Mastney et al. | 74—527 |
| 2,791,124 | 5/1957 | Gossard | 74—527 X |
| 2,826,093 | 3/1958 | Draper | 74—527 |
| 2,917,942 | 12/1959 | Jarrett et al. | 74—504 |
| 3,048,684 | 8/1962 | Sharp et al. | 74—527 X |
| 3,119,279 | 1/1964 | Reece | 74—528 |

BROUGHTON G. DURHAM, *Primary Examiner.*